PULSE GENERATOR

Filed Sept. 9, 1947 2 Sheets-Sheet 1

Inventor
CLARKE M. GILBERT
By
H. S. Mackey
Attorney

June 5, 1951 C. M. GILBERT 2,555,440

PULSE GENERATOR

Filed Sept. 9, 1947 2 Sheets-Sheet 2

Inventor

CLARKE M. GILBERT

By H. S. Mackey

Attorney

Patented June 5, 1951

2,555,440

UNITED STATES PATENT OFFICE 2,555,440

PULSE GENERATOR

Clarke M. Gilbert, Chappaqua, N. Y., assignor to General Precision Laboratory Incorporated, a corporation of New York Application September 9, 1947, Serial No. 773,061

12 Claims. (Cl. 250—27)

This invention relates to a pulse generation circuit wherein the instantaneous time of generation of the pulses may be accurately regulated to occur over a relatively wide range.

To accomplish such a regulatory control as respects time of pulse generation, the present invention compares a preselected regulatable direct current signal with the instantaneous amplitude of a wave form whose amplitude varies as a function of time, such as a saw-tooth wave, and when the amplitude of the variable amplitude wave equals that of the preselected signal a sharp pulse of relative short duration is produced. A linear saw-tooth waveform is considered the most convenient for use as a comparison signal since its amplitude varies directly with the time elapsed from its initiation and hence if, as in the present invention, a pulse is generated at any instant of time that the amplitude of the wave attains a value equal to a direct current potential that may be varied at will, the time of generation of the pulse may be made to take place at any time during the existence of the saw-tooth waveform from its initiation to its termination by direct variation of the direct current signal introduced into the system.

A saw-tooth waveform increases gradually from zero amplitude at zero time to a maximum and then decreases almost instantaneously to zero amplitude at the time of its termination. This gradual increase and sudden decrease has in the past led to certain disadvantages in the production of pulses regulatable as to time by the comparison of direct current signals with the instantaneous, amplitude of a saw-tooth wave. In the circuits as heretofore used, the gradual increase in amplitude of the saw-tooth wave produced only a low amplitude positive pulse when the amplitude of the saw-tooth wave exceeded the preselected direct current signal but produced a high amplitude negative pulse at the time of termination of the saw-tooth wave. Since the positive pulse produced is the only one which can be varied as to its occurrence in time, the negative pulse always taking place at the fixed time of termination of the saw-tooth wave, the positive pulse is the only one that has utility in the production of pulses which are regulatable as to time and complicated circuits have been necessary to amplify the relatively low amplitude wanted signal and at the same time reject the high amplitude unwanted negative signal.

In the instant invention circuits have been devised whereby a high amplitude steep front signal is developed at the instant that the sawtooth wave amplitude becomes greater than the direct current regulatable signal and the amplitude of the positive signal so produced is as great as the amplitude of the unwanted negative signal produced when the amplitude of the saw-tooth wave suddenly decreases at its termination. Much simpler and more economical circuits may therefore be employed to utilize the positive signal for generating the time variable pulse and at the same time for rejecting and suppressing the unwanted negative signal.

To accomplish the purpose of providing a sharp positive signal commensurate in amplitude to that of the unwanted negative signal necessarily produced because of the nature of a saw-tooth waveform, the present invention utilizes a diode in series with a resistance connected between terminals, one of which has the regulatable direct current signal impressed thereon and the other of which varies as the amplitude of the saw-tooth waveform. As long as the amplitude of the saw-tooth wave is less than the value of the direct current signal, the circuit connections are such that the diode is in a non-conductive state and the opposite ends of the series connected resistance are at the same potential, namely, that represented by the direct current signal. When, however, the amplitude of the saw-tooth wave exceeds that of the direct current signal, the diode is made to conduct and one terminal of the series resistance is made to increase in potential as the amplitude of the saw-tooth wave increases, while the other terminal is maintained at the now lower potential representative of the direct current regulatable signal. The opposite ends of the series resistance are connected to the respective grids of a differential amplifier which permits the grids to have any potential impressed thereon within and somewhat beyond the range of amplitude variation of the saw-tooth wave, without impairing its operation as an amplifier when a difference in potential exists between the respective grids.

Where as here the range in amplitude of the saw-tooth wave may be of the order of 90 volts and the range of adjustment of the direct current signal an equal amount, the range of potential differences which would be likely to occur between grid and cathode of an ordinary amplifier would be so great as to impair its operation at some point in that range.

In the instant invention, however, these difficulties are nicely avoided by the use of a differential amplifier circuit wherein as long as the signals impressed on the grids are the same, regardless of their actual potential as respects ground, the potential between the grids and the cathodes is of the proper value for correct operation. When, however, the signals impressed on the respective grids are different, as when the saw-tooth wave amplitude exceeds that of the direct current regulatable signal, differential action takes place. That is to say, the relative potential existing between the grid and cathode of one of the tubes of the differential amplifier is reduced while the relative potential between the grid and cathode of the other tube is increased, giving rise to an abrupt increase in plate current in the first tube and hence producing a signal having a steep rise and of considerable amplitude.

The exact nature of the invention will be more clearly understood from reference to the following detailed description taken together with the drawings in which.

Figure 1:
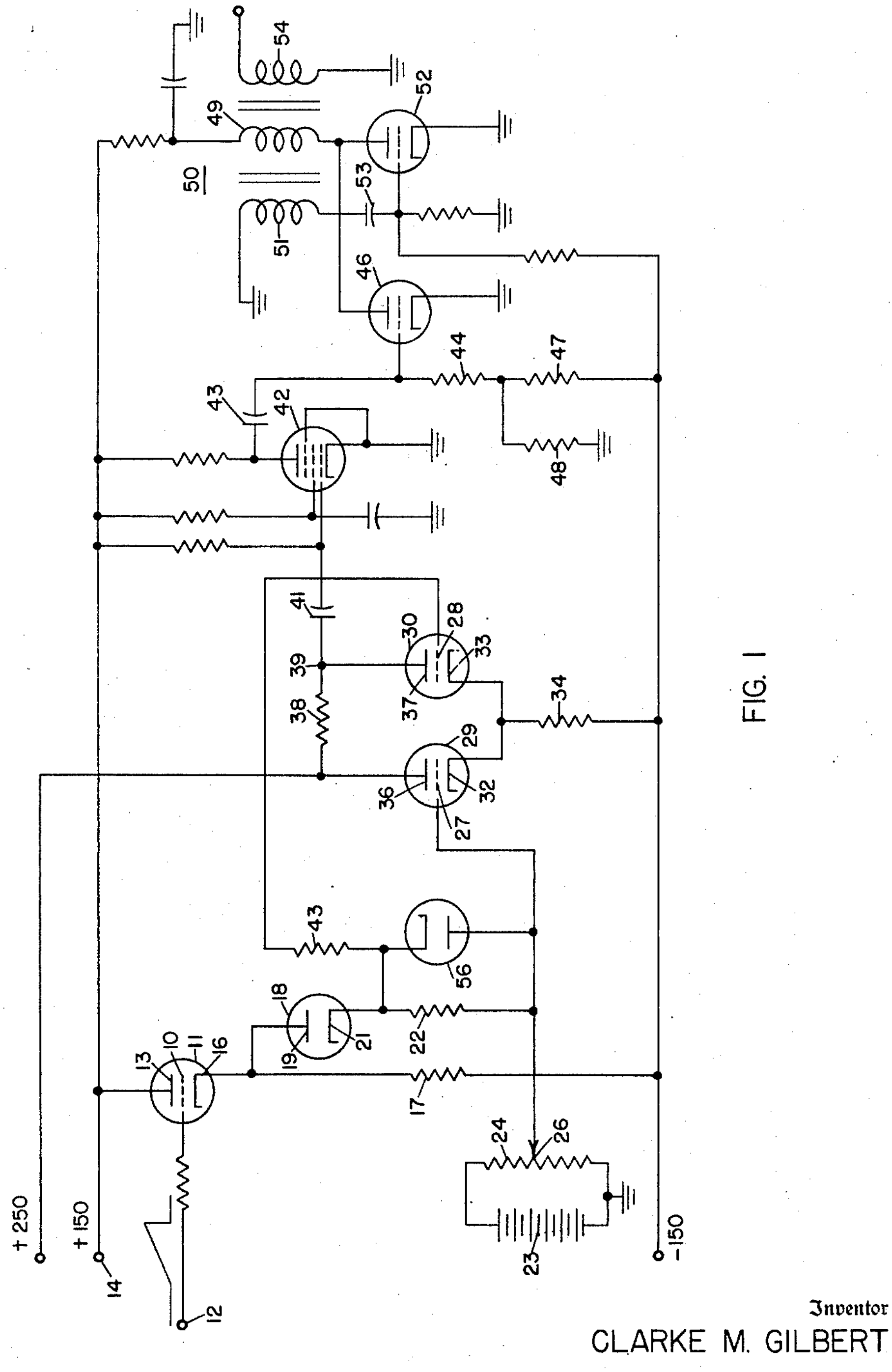
Fig. 1 is a schematic illustration of a circuit embodying the principles of the invention.

Referring to Fig. 1 a saw-tooth wave derived from a source indicated generally by terminal 12 is impressed on the grid 10 of tube 11. The saw-tooth wave may be generated by any of the usual methods and by way of example, may have a maximum amplitude of 90 volts and a duration from initiation at zero potential to termination at the aforesaid 90 volts of 1500 microseconds.

The anode 13 of tube 11 is connected directly to a source of positive potential indicated diagrammatically by the terminal 14 and the cathode 16 is connected to a source of negative potential thru a resistance 17.

The tube 11 therefore, acts as a so-called "cathode follower" and changes in potential impressed upon the grid are reflected in equal changes in potential of the cathode, which in this case follows the varying amplitude of the impressed saw-tooth waveform.

A diode 18 has its anode 19 connected directly to the cathode 16 and its cathode 21 connected thru a resistance 22 to a source of regulatable direct current signal or potential, which for the purposes of simplification has been here illustrated as a battery 23 shunted by a potentiometer 24 having an adjustable contact 26. It is to be understood, of course, that such illustration is diagrammatic only and that any source of direct current potential may be utilized whose potential is adjustable or capable of regulation over a range at least as great as the range of amplitude of the impressed saw-tooth waveform.

Assume for the purposes of explanation of the operation of the circuit that, as heretofore stated, the saw-tooth wave impressed on the grid 10 has an amplitude variation of from zero to 90 volts and assume further that the contact 26 has been adjusted to approximately the middle of the range of potentiometer 24 so that the potential of contact 26 and hence the lower end of resistance 22 is at 45 volts. During the first half of the duration of the saw-tooth waveform, the potential applied to the grid 10, the cathode 16, because of the cathode follower action, and the anode 19 of the diode 18 connected to the cathode 16, will be something less than 45 volts. If it be assumed for the present, that diode 18 is an ideal diode, the cathode 21 thereof is at the potential of contact 26, i. e., 45 volts and since the potential of the cathode is higher than that of the anode, the diode is in a non-conductive condition. As soon however, as the amplitude of the saw-tooth wave exceeds the value of 45 volts the anode 19 exceeds the cathode 21 in potential and the diode becomes conductive causing the cathode 21 and hence the upper end of resistance 22 to assume the same potential as the anode, that is to say, the potential represented by the amplitude of the saw-tooth wave.

Figure 2:
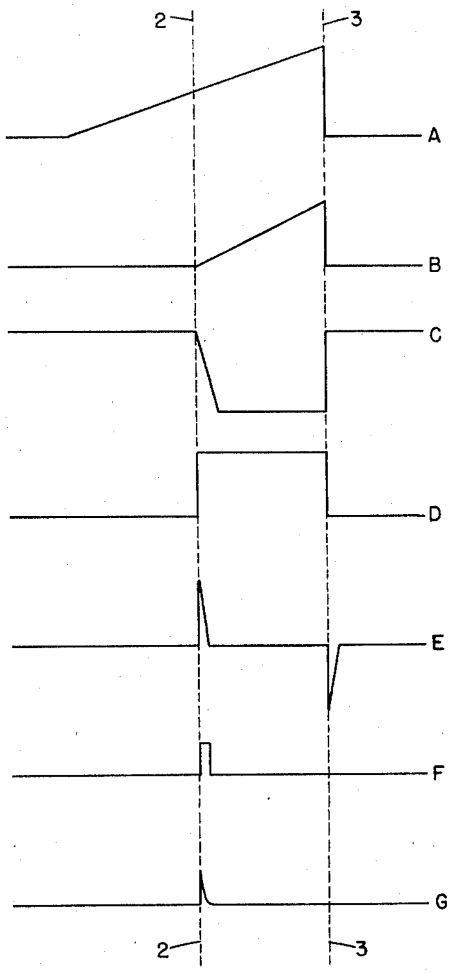
Fig. 2 is an illustration of the various waveforms produced at critical points of the circuit, the time base scale being the same in all cases.

This action may be more easily visualized by reference to the waveforms of Fig. 2. In this figure, the waveform A represents the saw-tooth wave impressed on the grid 10 and therefore the variation of potential with time of the anode 19 and the waveform B the variation of potential as respects time of the cathode 21 and hence the upper end of resistance 22.

During the first half of the existence of the saw-tooth wave A, that is up to the dotted line 2—2 the amplitude thereof is less than the 45 volts impressed on cathode 21 by the source 23 and hence the potential on the cathode remains constant as illustrated in waveform B. When, however, the amplitude of the saw-tooth wave and hence the potential of anode 19 begins to exceed the value of 45 volts heretofore selected, the diode becomes conductive and the cathode 21 rises in potential as the amplitude of the saw-tooth wave increases as is illustrated by that portion of waveform B which lies between lines 2—2 and 3—3.

The opposite ends of resistance 22, therefore, have impressed thereon equal potentials of a value equal to the pre-selected potential of contact 26 for a time the duration of which is proportional to the potential of contact 26, subsequent to which time the potential of the upper end of resistance 22 increases as respects the potential of the lower end as the amplitude of the saw-tooth wave increases. In other words, the difference in potential existing across resistance 22 as against time is represented by the chart of waveform B where the portion of zero slope represents the reference level or zero potential difference and the portion between the lines 2—2 and 3—3 a uniformly increasing potential difference.

The opposite ends of resistance 22 are connected to respective grids 27 and 28 of tubes 29 and 30 connected so as to constitute a differential amplifier. Cathodes 32 and 33 are connected together and to a negative source of potential thru a resistance 34, while anode 36 is connected directly to a positive source of potential and anode 37 is connected to the same source thru an anode resistance 38.

The differential amplifier consisting of tubes 29 and 30 and their associated circuits functions to produce an abrupt signal output of relatively high amplitude regardless of the wide range in potentials impressed on the grids 27 and 28 by the adjustment of contact 26 as follows:

Assume as before, that the contact 26 is so adjusted as to impress a potential of 45 volts on grid 27 and that at the instant of time considered the saw-tooth wave impressed on the input has not yet attained an amplitude of that value. Then the potential impressed on grid 28 will also be 45 volts and equal potentials are impressed on the respective inputs of tubes 29 and 30. Under these conditions plate currents will flow thru both tubes and both currents flow thru the common cathode resistance 34 producing a potential drop thereacross which is equal to the sum of the plate currents multiplied by the value of the resistance 34 and the cathodes 32 and 33 are caused to assume a potential as respects ground which is the algebraic sum of this potential drop and the potential of the supply source to which the lower end of resistance 34 is connected. The cathodes 32 and 33, therefore, are not at a fixed potential as respects ground but the potential imposed thereon varies as the sum of the plate currents existing in both tubes and hence as and in the same direction as the equal potentials impressed on grids 27 and 28. By proper selection of the values of resistances 34 and 38, the characteristics of tubes 29 and 30 and the potentials applied to the cathode and anode circuits of these tubes, the potential of contact 26 and hence of the grids 27 and 28 may be varied over the range of from zero to 90 volts while nevertheless maintaining the grids biased negatively with respect to their cooperating cathodes the bias potential being of such a value that the amplifying properties thereof are not impaired.

By way of example only and not as a limitation it has been found that by the use of 917A tubes with resistances 34 and 38 each having a value of 47,000 ohms with a positive potential of 250 volts applied to the anode circuit and a negative potential of 150 volts applied to the cathode circuits the desirable range of variation in potential applied to the grids may be had while at the same time permitting proper amplification by the tubes at any point in this range when the potentials applied to the grids is varied with respect to each other.

Consider now the action that results when the potentials applied to the grids 27 and 28 are unequal, that is, when as heretofore described the amplitude of the saw-tooth wave exceeds that of the preselected potential of contact 26 so that a potential difference exists across resistance 22.

Since grid 28 has an increased potential impressed thereon the negative bias existing between this grid and its cooperating cathode 33 is reduced thereby increasing the plate current flowing in this tube. The increase in plate current, since it flows thru resistance 34, increases the potential drop thereacross and thereby increases the positive potential of cathodes 32 and 33 connected thereto. If no other action obtained, the cathode 33 would be so greatly increased in a positive direction as to substantially cancel the effect of the increase in potential applied to grid 28 and no amplification or signal would result. However, a small increase in positive potential of cathodes 32 and 33 acts to increase the negative bias existing between cathode 32 and grid 27, the latter being fixed at the potential of contact 26 while cathode 32 is becoming more positive with respect thereto. This increase in negative bias reduces the plate current of tube 29 which also flows thru resistance 34 and contributes to the potential drop existing thereacross so that the net effect, while producing some increase in potential of cathodes 32 and 33, is such as to permit a much greater relative increase in potential of grid 28, thereby producing a sharp high amplitude increase in plate current of tube 30 as the result of a relatively slower and much smaller amplitude variation between grids 27 and 28.

The increase in plate current in tube 30 results in an increased potential drop in resistance 38 connected in the anode circuit of this tube and there is therefore produced a voltage signal at terminal 39 which is transmitted thru coupling condenser 41 to the input of amplifier tube 42.

On very high potential differences impressed between the grids of tubes 29 and 30, tube 30 may be caused to draw grid current and for this reason it is preferred to connect resistance 43 between the grid 28 and the cathode 21 of diode 18 so that any potential variation resulting from such grid current flow will not affect the potential of the upper terminal of resisance 22.

The potential variation which appears at terminal 39 and which is impressed on the input of tube 42 is illustrated by waveform C of Fig. 2. It is to be noted that the potential at this terminal is substantially constant until the sawtooth wave amplitude exceeds the direct current reference voltage represented by the setting of contact 26 and thereafter decreases abruptly to a constant minimum value producing a steep wave front which may be advantageously amplified and differentiated to produce the desired waveform for pulse generation.

The signal developed by the differential amplifier 29, 30 is as heretofore stated impressed on the input of amplifier tube 42 where it is amplified to give an output signal of the form as illustrated by the waveform D of Fig. 2. This output signal is in turn differentiated by the circuit consisting of condenser 43 and resistance 44 so that there is impressed upon the input of tube 46 positive and negative pulses corresponding to the rate of change in amplitude of the waveform D of Fig. 2.

There is produced therefore as indicated by the waveform E of Fig. 2 a sharp high amplitude positive pulse at a time when the amplitude of the impressed saw-tooth wave exceeds the potential of the preselected direct current signal and a negative pulse of substantially similar form occurring at the time of termination of the impressed saw-tooth wave.

The negative pulse is undesired and has no utility so that the tube 46 on whose input the waveform D is impressed is so operated that this negative pulse has little effect on the plate current of this tube. To this end tube 46 is biased near cut-off by resistances 47 and 48 so that the positive pulse applied to the input thereof will produce a plate current pulse in tube 46 as indicated by waveform F of Fig. 2, while the negative pulse of waveform E has little if any effect.

Figure 3:
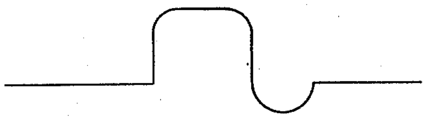
Fig. 3 is an illustration of the waveform of the output pulse, based on a greatly expanded scale.

The current pulse generated in tube 46 flows thru the primary 49 of transformer 50 connected in the output circuit of tube 52, the secondary 51 of which is connected to the input of tube 52 in series with condenser 53, forming a blocking oscillator which generates a pulse G (Fig. 2). This pulse is of extremely short duration and is shown on an expanded time scale in Fig. 3. For example the time of duration of the pulse may be of the order of one-half a microsecond and the instant of its initiation may be made to occur at any time within a range of 1500 microseconds the time of duration of the impressed sawtooth waveform by selective adjustment of the potential of the direct current signal.

This time variable pulse may then be derived from winding 54 of transformer 50 and used for any of the innumerable purposes for which it is adapted such as the generation of a known time delayed sweep wave, known time delayed indicating pulses, or the like.

In describing the invention to this point it has been assumed that diode 18 is an ideal diode, of course, in practical circuits such ideal operation does not occur and certain errors may be introduced by reason of the practical departure from the ideal criterion. While the errors so introduced are not excessive, it is deemed preferable although not absolutely essential to minimize such errors as do occur by use of the diode 56, connected in parallel to resistance 22 and in opposing relation to diode 18.

The practical diode, as distinguished from the ideal, has a potential existing across it when no current is flowing therethru. This potential is of the order of .5 volt but is variable with the variation in heater voltage.

If the diode 56 were not used and the contact 26 set at a potential of 10 volts, the diode 18 would begin to conduct when its anode 19 reached a potential of 9.5 volts as a result of imposition of the saw-tooth wave on the input of the system and the potential existing across diode 18 under no current conditions. If these conditions of operation were constant, the effect of the diode becoming conductive at a potential somewhat lower than that for which the contact 26 was set could be overcome by proper calibration of the system, however, as indicated the zero current potential of a diode varies with the heater voltage and the usual variation of supply potential may so change the heater potential that the zero current potential of the diode may vary as much as 20%, that is, a value of .6 volt.

Under such circumstances the diode 18 will now conduct when its anode 19 reaches a potential of 9.4 volts resulting in an error of operation of slightly over 1%. By connecting the diode 56 across resistance 22 so that its zero current potential is added to that of the potential of contact 26 and the zero current potential of each of the diodes is .5 volt the cathode potentials of each of these diodes is at 10.5 volts when the contact 26 is set at a potential of 10 volts and diode 18 will now conduct when its anode reaches a potential of 10 volts.

If it be assumed again that the supply voltage varies to such an extent that the zero current potential increases as much as 20% it will become .6 volt for each diode. In that case the potential of the cathodes of the diodes will vary becoming 10.6 volts but diode 18 will still begin to conduct when its anode is at 10 volts because the two opposing diode potentials have changed by the same amount. Under these conditions no error is introduced despite a wide fluctuation in supply potential.

However, due to the variation in different tubes and the fact that some current will be flowing through resistance 22 from the diode 56 the zero current potentials of diodes 18 and 56 may not be the same as was assumed in the numerical example just given. Even where this variation does exist, however, the percentage error is greatly reduced by use of the diode 56. Assume for example, that the zero current potential across diode 56 is .4 volt while that across diode 18 is .5 volt and that as before contact 26 is set at a potential of 10 volts. Under these conditions diode 18 will conduct when its anode potential reaches 9.9 volts. Now assume as before, that the supply source fluctuates to such an extent that the zero current potential across diode 18 increases 20% that is to .6 volt. These changed conditions will also increase the zero current potential of diode 56 by the same margin of 20% or to .48 volt and the cathodes of the diodes are brought to a potential of 10.48 volts. Subtracting the zero current potential of diode 18, namely, .6 volt from this potential, indicates that diode 18 will now conduct when its anode potential reaches a value of 9.88 volts, a change of only .02 volt from the previous value of 9.9 volts, which corresponds to an error of only .2% for a change of 20% in zero current potentials as compared with the 1% error obtained without the use of diode 56. In other words, under extreme adverse conditions where the diodes are so mismatched that diode 56 has a zero current potential thereacross of only 80% of that of diode 18, the variation due to heater change is reduced by a factor of 5.

What is claimed is:

1. A pulse generation circuit comprising, a first input circuit having a signal impressed thereon whose amplitude varies as a function of time, a second input circuit, means for impressing a signal of constant but preselected amplitude less than the maximum amplitude of said variable signal thereon, comparison circuit means connected between said first and second input circuits producing a comparison signal in the output thereof whose amplitude varies only at such times as the amplitude of said variable amplitude signal exceeds the amplitude of said constant amplitude signal, differential amplifier means having a pair of input circuits, one of which is connected to the output of said comparison circuit means and the other of which is connected to said second input circuit producing a signal wave whose amplitude varies abruptly at the time of initial variation of said comparison signal and means for generating a pulse of short time duration at the time of abrupt variation of said differential amplified signal.

2. A pulse generation circuit comprising, a first input circuit having a signal impressed thereon whose amplitude varies as a function of time, a second input circuit, means for impressing a signal of constant but preselected amplitude less than the maximum amplitude of said variable signal thereon, a rectifier and resistor connected in series between said first and second input circuits producing across said resistor a potential whose amplitude varies only at such times as the amplitude of said variable amplitude signal exceeds the amplitude of said constant amplitude signal, said rectifier being most conductive in the direction of said second input circuit, a differential amplifier having a pair of input circuits connected to opposite ends of said resistor producing in its output circuit a signal wave whose amplitude varies abruptly at the time of initial variation of the potential developed across said resistor and means for generating a pulse of short timed duration at the time of abrupt variation of said differential amplifier output.

3. A pulse generation circuit comprising, a first input circuit having a signal impressed thereon whose amplitude varies as a function of time, a second input circuit, means for impressing a signal of constant but preselected amplitude less than the maximum amplitude of said variable signal thereon, a diode and a resistor connected in series between said first and second input circuits, said diode having its anode connected to said first signal input circuit and its cathode connected to said second signal input circuit through said series resistance, thereby producing a potential across said resistor whose amplitude varies only at such times as the amplitude of said variable amplitude signal exceeds the amplitude of said constant amplitude signal, a differential amplifier having a pair of input circuits connected to opposite ends of said resistor producing in its output circuit a signal wave whose amplitude varies abruptly at the time of initial variation of the potential developed across said resistor, and means for generating a pulse of short timed duration at the time of abrupt variation of said differential amplifier output.

4. A pulse generation circuit comprising, a first input circuit having a signal impressed thereon whose amplitude varies as a function of time, a second input circuit, means for impressing a signal of constant but preselected amplitude less than the maximum amplitude of said variable signal thereon, a diode having its anode connected to said first input circuit and its cathode connected to said second input circuit through a series resistor producing across said resistor a potential whose amplitude varies only at such times as the amplitude of said variable signal exceeds the amplitude of said constant amplitude signal, a second diode connected in shunt to said resistor and in opposition to said first mentioned diode, a differential amplifier having a pair of input circuits connected to opposite ends of said resistor producing an output signal wave whose amplitude varies abruptly at the time of initial variation of the potential developed across said resistor and means for generating a pulse of short time duration at the time of abrupt variation of said differential amplifier output.

5. A pulse generation circuit comprising, a first input circuit having a signal impressed thereon whose amplitude varies as a function of time, a second input circuit, means for impressing a signal of constant but preselected amplitude less than the maximum amplitude of said variable signal thereon, a diode having its anode connected to said first input circuit and its cathode connected to said second input circuit through a series resistor producing across said resistor a potential whose amplitude varies only at such times as the amplitude of said variable signal exceeds the amplitude of said constant amplitude signal, first and second tube sections each having at least an anode, cathode and control electrode, said control electrodes being connected to the opposite terminals of said resistor and said cathodes being connected together and to a source of potential supply through a resistor common to the input and output circuits of each of said tube sections and pulse generation means connected to the output of one of said tube sections for generating a pulse of short time duration at the instant of initial variation of the output of said one tube section.

6. A pulse generation circuit comprising, a first input circuit having a signal impressed thereon whose amplitude varies as a function of time, a second input circuit, means for impressing a signal of constant but preselected amplitude less than the maximum amplitude of said variable signal thereon, a diode having its anode connected to said first input circuit and its cathode connected to said second input circuit through a series resistor producing across said resistor a potential whose amplitude varies only at such times as the amplitude of said variable signal exceeds the amplitude of said constant amplitude signal, a second diode connected in shunt to said resistor and in opposition to said first mentioned diode, first and second tube sections each having at least an anode, cathode and control electrode, said control electrodes being connected to the opposite terminals of said resistor and said cathodes being connected together and to a source of potential supply through a resistor common to the input and output circuits of each of said tube sections and pulse generation means connected to the output of one of said tube sections for generating a pulse of short time duration at the instant of initial variation of the output of said one tube section.

7. A pulse generation circuit comprising, a first input circuit having a saw-tooth signal wave impressed thereon, a second input circuit, means for impressing a signal of constant but preselected amplitude less than the maximum amplitude of said saw-tooth signal thereon, comparison circuit means connected between said first and second input circuits producing a comparison signal in the output thereof whose amplitude varies as the amplitude of said saw-tooth signal only at such times as the amplitude of said saw-tooth signal exceeds the amplitude of said constant amplitude signal, differential amplifier means having a pair of input circuits, one of which is connected to the output of said comparison circuit and the other of which is connected to said second input circuit producing a signal wave whose amplitude abruptly decreases to a substantially constant value at the time of initial variation of said comparison signal and whose amplitude increases to its original value at the termination of variation of said comparison signal, amplifying means for amplifying and inverting said last mentioned signal wave whereby a square wave pulse is produced, means for differentiating said square wave pulse to provide a positive pulse at its initiation and a negative pulse at its termination, means for producing a current pulse from said positive pulse and for suppressing said negative pulse and means including a blocking oscillator for producing a pulse of short time duration from said current pulse.

8. A pulse generation circuit comprising, a first input circuit having a saw-tooth signal wave impressed thereon, a second input circuit, means for impressing a signal of constant but preselected amplitude less than the maximum amplitude of said saw-tooth signal thereon, a rectifier and a resistor connected in series between said first and second input circuits producing across said resistor a potential whose amplitude varies as the amplitude of said saw-tooth signal only at such times as the amplitude of said saw-tooth signal exceeds the amplitude of said constant amplitude signal, said rectifier being most conductive in the direction of said second input circuit, a differential amplifier having a pair of input circuits connected to opposite ends of said resistor producing in its output circuit a signal wave whose amplitude abruptly decreases to a substantially constant value at the time of initial variation of the potential produced across said resistor and whose amplitude increases to its original value at the termination of variation of the potential produced across said resistor, amplifying means for amplifying and inverting said last mentioned signal wave producing a square wave pulse, means for differentiating said square wave pulse to provide a positive pulse at its initiation and a negative pulse at its termination, and means for producing a pulse of short duration from said positive pulse and for suppressing said negative pulse.

9. A pulse generation circuit according to claim 8 in which said rectifier comprises a diode having its anode connected to said first signal input circuit and its cathode connected to said second signal input circuit thru said series resistance.

10. A pulse generation circuit comprising a first input circuit having a saw-tooth signal wave impressed thereon, a second input circuit, means for impressing a signal of constant but preselected amplitude less than the maximum amplitude of said saw-tooth signal thereon, a diode having its anode connected to said first input circuit and its cathode connected to said second input circuit through a series resistor producing across said resistor a potential whose amplitude varies as the amplitude of said saw-tooth signal only at such times as the amplitude of said saw-tooth signal exceeds the amplitude of said constant amplitude signal, a second diode connected in shunt to said resistor and in opposition to said first mentioned diode, a differential amplifier having a pair of input circuits connected to opposite ends of said resistor producing in its output circuit a signal wave whose amplitude abruptly decreases to a substantially constant value at the time of initial variation of the potential produced across said resistor and whose amplitude increases to its original value at the termination of variation of the potential produced across said resistor, amplifying means for amplifying and inverting said last mentioned signal wave producing a square wave pulse, means for differentiating said square wave pulse to provide a positive pulse at its initiation and a negative pulse at its termination, and means for producing a pulse of short duration from said positive pulse and for suppressing said negative pulse.

11. A pulse generation circuit comprising, a first input circuit having a saw-tooth signal wave impressed thereon, a second input circuit, means for impressing a signal of constant but preselected amplitude less than the maximum amplitude of said saw-tooth signal thereon, a diode having its anode connected to said first input circuit and its cathode connected to said second input circuit through a series resistor producing across said resistor a potential whose amplitude varies as the amplitude of said saw-tooth signal only at such times as the amplitude of said saw-tooth signal exceeds the amplitude of said constant amplitude signal, first and second tube sections each having at least an anode, cathode and control electrode, said control electrodes being connected to the opposite ends of said resistor and said cathodes being connected together and to a source of potential supply through a resistor common to the input and output circuits of each of said tube sections, an amplifier coupled to the anode of one of said tube sections producing a square wave pulse, means for differentiating said square wave pulse to provide a positive pulse at its initiation and a negative pulse at its termination and means for producing a pulse of short duration from said positive pulse and for suppressing said negative pulse.

12. A pulse generation circuit comprising, a first input circuit having a saw-tooth signal wave impressed thereon, a second input circuit, means for impressing a signal of constant but preselected amplitude less than the maximum amplitude of said saw-tooth signal thereon, a diode having its anode connected to said first input circuit and its cathode connected to said second input circuit through a series resistor producing across said resistor a potential whose amplitude varies as the amplitude of said saw-tooth signal only at such times as the amplitude of said saw-tooth signal exceeds the amplitude of said constant amplitude signal, a second diode connected in shunt to said resistor and in opposition to said first diode, first and second tube sections each having at least an anode, cathode and control electrode, said control electrodes being connected to the opposite ends of said resistor and said cathodes being connected together and to a source of potential supply through a resistor common to the input and output circuits of each of said tube sections, an amplifier coupled to the anode of one of said tube sections producing a square wave pulse, means for differentiating said square wave pulse to provide a positive pulse at its initiation and a negative pulse at its termination and means for producing a pulse of short duration from said positive pulse and for suppressing said negative pulse.

CLARKE M. GILBERT.

REFERENCES CITED

The following references are of record in the file of this patent:

UNITED STATES PATENTS

| Number | Name | Date |
|---|---|---|
| 2,230,926 | Bingley | Feb. 4, 1941 |
| 2,250,708 | Herz | July 29, 1941 |
| 2,414,486 | Rieke | Jan. 21, 1947 |
| 2,422,204 | Meacham | June 17, 1947 |
| 2,427,687 | Norgaard | Sept. 23, 1947 |